United States Patent Office 3,267,148
Patented August 16, 1966

3,267,148
CHEMICAL PROCESSES
David Taub, Metuchen, and Norman L. Wendler, Summit,
N.J., assignors to Merck & Co., Inc., Rahway, N.J., a
corporation of New Jersey
No Drawing. Filed July 23, 1962, Ser. No. 211,861
4 Claims. (Cl. 260—591)

This invention is concerned with a novel method of preparing benzophenone compounds. More particularly, it is concerned with a new and novel process for making highly substituted benzophenone compounds which are useful as intermediates in various syntheses of griseofulvin and related compounds. Still more particularly, the invention pertains to a process for rearranging a substituted phenyl benzoate to the correspondingly substituted benzophenone.

Griseofulvin is an orally administrable antifungal agent having the structural formula:

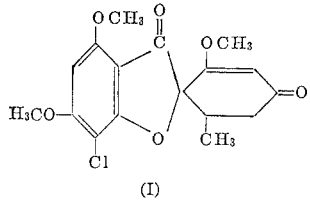

(I)

The product of this compound by fermentation using strains of Penicillia has been known for some time. In addition to this microbiological synthesis, there is significant interest in the total chemical synthesis of griseofulvin as well as of compounds related to griseofulvin. One method of chemical synthesis has been described by Taub et al., Chemistry and Industry, 1962, pages 557–558.

In the chemical synthesis of griseofulvin and related compounds, a benzophenone of the structural formula:

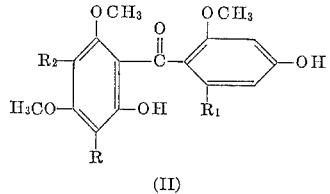

(II)

is a key intermediate. In the above formula R and $R_2$ may be hydrogen, chlorine or fluorine (and may be the same or different in a given substance), and $R_1$ may be lower alkyl or hydrogen. When R is chloro, $R_2$ hydrogen and $R_1$ methyl, the intermediate is one which leads to formation of griseofulvin itself.

It is an object of the present invention to provide a new and improved method of synthesizing the benzophenone intermediate of Formula II above. It is a further object to provide a method of synthesis which employs as starting material a substituted phenyl benzoate compound and which lacks many of the disadvantages of previously described syntheses of this substance. Other objectives will become apparent from the ensuing discussion of our invention.

According to the present invention, it has now been discovered that a benzoate ester having the general Formula III may be rearranged to a benzophenone having the general Formula II by intimately contacting the benzoate ester with titanium tetrahalide.

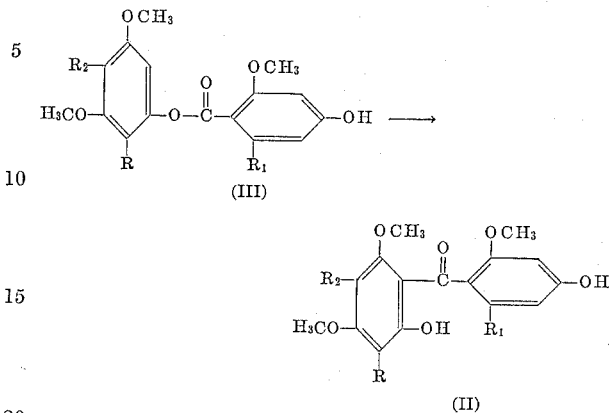

In the above flow sheet R and $R_2$ represent hydrogen, chloro or fluoro and may be the same or different in a given compound, and $R_1$ represents hydrogen or lower alkyl, e.g., methyl, ethyl, propyl.

The process of the invention is carried out by contacting a compound of Formula III with a titanium tetrahalide, and preferably with titanium tetrachloride, in a suitable solvent medium. We prefer to employ about equal quantities (by weight) of the benzoate ester and the titanium tetrahalide, although satisfactory results are achieved when the weight ratio of benzoate reactant and titanium halide is within the range of about 1:0.25 to 1:4. The rearrangement is carried out in an anhydrous solvent medium, and preferably in a solvent that dissolves both the organic compound and the titanium salt. Nitrobenzene is a satisfactory solvent medium and is preferred, although others such as dimethyl sulfoxide could also be used if desired. The specific solvent to be utilized is not a critical aspect of the invention.

It is preferred to conduct the rearrangement of the benzoate ester of Formula III to the benzophenone of Formula II at temperatures of from about 15–30° C. although the reaction occurs and can be carried out at temperatures ranging from about 0° to about 50° C. As will be understood by those skilled in this art, the rearrangement is slower at the lower temperatures while the formation of undesirable side products increases at the higher temperatures. The optimum reaction time will depend to a large extent on the temperature. At the preferred temperature of 15–30° C., we have found that highly satisfactory yields are obtained in about twelve hours although the reaction is frequently allowed to proceed from 15 to 20 hours in order to obtain the maximum amount of rearrangement.

At the completion of the rearrangement, the reaction mixture is acidified and the desired benzophenone compound recovered by techniques known to those skilled in this art, as, for example, by extraction into suitable organic solvents and recovery from such solvents.

As indicated previously, the process of this invention provides a greatly improved method for obtaining key intermediates in the chemical synthesis of griseofulvin and related compounds. Examples of suitable starting materials for the process of this invention are 2-chloro- 3,5-dimethoxyphenyl 2'-methoxy-4'-hydroxy-6'-methyl benzoate, 2-fluoro-3,5-dimethoxyphenyl 2'-methoxy-4'-hydroxy16'-methyl benzoate, 4-chloro-3,5-dimethoxyphenyl 2'-methoxy-4'-hydroxy-6'-methyl benzoate, 2-chloro-3,5-dimethoxyphenyl 2'-methoxy-4'-hydroxy benzoate, and 2,4-dichloro-3,5-dimethoxyphenyl 2'-methoxy-4'-hydroxy-6'-methyl benzoate. The starting materials for the process of this invention are described in the pending U.S. patent application of Taub, Wendler and Kuo, S.N. 145,033. From these compounds there is obtained according to the process of this invention 2,4'-dihydroxy-3-chloro-4,6,2'-trimethoxy-6'-methylbenzophenone, 2,4'-dihydroxy-3-fluoro-4,6,2'-trimethoxy-6'-methylbenzophenone, 2,4'-dihydroxy-5-chloro-4,6,2'-trimethoxy-6'-methylbenzophenone, 2,4'-dihydroxy-3-chloro-4,6,2'-trimethoxybenzophenone, and 2,4-dihydroxy-3,5-dichloro-4,6,2'-trimethoxy-6'-methylbenzophenone, respectively.

The benzophenone compounds having Formula III above are converted to griseofulvin and related compounds by treatment with potassium ferricyanide and potassium carbonate, and hydrogenation of the resulting dehydrogriseofulvin or dehydrogriseofulvin analog. This process is described in detail in the copending U.S. patent application of Slates and Wendler, Serial No. 145,034.

The following examples are given for the purpose of illustration and not by way of limitation:

EXAMPLE 1

*2,4'-dihydroxy-3-chloro-4,6,2'-trimethoxy-6'-methylbenzophenone*

580 mg. of titanium tetrachloride is added to a solution of 480 mg. of 2-chloro-3,5-dimethoxyphenyl 2-methoxy-4-hydroxy-6-methyl benzoate in 5 ml. of nitrobenzene. The reaction mixture is maintained in an anhydrous condition. It is allowed to stand for about 18 hours at 20° C., and at the end of this time 100 ml. of cold 2 N hydrochloric acid and 100 ml. of ether is added. The mixture is stirred and the layers allowed to separate. The ether layer is removed and extracted with an equal volume of cold 5% sodium hydroxide solution. The aqueous extract is then acidified with dilute hydrochloric acid and then extracted with 2 x 40 ml. portions of chloroform. The chloroform extracts are combined, dried over magnesium sulfate and then concentrated to dryness in vacuo. The residue thus obtained is crystallized from acetone-ether to give substantially pure 2,4'-dihydroxy-3-chloro-4,6,2'-trimethoxy-6'-methylbenzophenone, M.P. 209–212° C. The mother liquors from this crystallization are chromatographed on 12 grams of neutral alumina and the end product eluted with benzene, benzene-chloroform and chloroform. Crystallization of the chloroform eluates from benzene gives additional benzophenone M.P. 209–212° C. In this way there is obtained a total of 240 mg. of benzophenone.

EXAMPLE 2

*2,4'-dihydroxy-3-fluoro-4,6,2'-trimethoxy-6'-methylbenzophenone*

To 240 mg. of 2-fluoro-3,5-dimethoxyphenyl 2-methoxy-4-hydroxy-6-methyl benzoate in 2.7 ml. of nitrobenzene there is added, under anhydrous conditions, 290 mg. of titanium tetrachloride. The mixture is allowed to stand at 20° C. for 15 hours. 75 ml. of cold 2 N hydrochloric acid and 75 ml. of ether are then added. After the mixture is agitated and the solvent layers allowed to stratify, the ether extract is separated and extracted with cold 5% sodium hydroxide solution. This latter extract is then acidified with diluted hydrochloric acid and extracted with 2 x 25 ml. of chloroform. The chloroform extracts are combined, dried over magnesium sulfate and concentrated in vacuo to dryness. The residue is crystallized from an ether-acetone mixture to give crystalline 2,4'-dihydroxy-3-fluoro-4,6,2'-trimethoxy 6'-methylbenzophenone.

EXAMPLE 3

*2,4'-dihydroxy-3-chloro-4,6,2'-trimethoxybenzophenone*

When the procedure of Example 1 is carried out employing 2-chloro-3,5-dimethoxyphenyl 2-methoxy-4-hydroxybenzoate as starting material, there is obtained 2,4'-dihydroxy-3-chloro-4,6,2'-trimethoxybenzophenone.

Any departure from the above description which conforms to the present invention is intended to be included within the scope of the claims.

What is claimed is:

1. The process for producing a compound having the formula

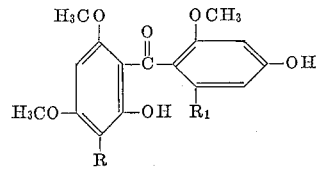

where R is chlorine or fluorine and $R_1$ is selected from the class consisting of hydrogen and lower alkyl, that comprises intimately contacting in an anhydrous solvent medium a compound having the formula

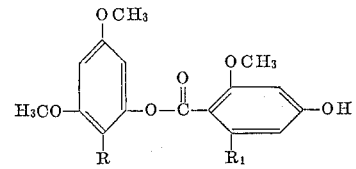

with titanium tetrachloride, where R and $R_1$ are as previously defined.

2. The process for preparing 2,4'-dihydroxy-3-chloro-4,6,2'-trimethoxy-6'-methylbenzophenone that comprises intimately contacting in an anhydrous solvent medium 2-chloro-3,5-dimethoxyphenyl 2-methoxy-4-hydroxy-6-methylbenzoate with titanium tetrachloride.

3. The process for preparing 2,4'-dihydroxy-3-fluoro-4,6,2'-trimethoxy-6'-methylbenzophenone that comprises intimately contacting in an anhydrous solvent medium 2-fluoro-3,5-dimethoxyphenyl 2-methoxy-4-hydroxy-6-methylbenzoate with titanium tetrachloride.

4. The process for preparing 2,4'-dihydroxy-3-chloro-4,6,2'-trimethoxybenzophenone that comprises intimately contacting in an anhydrous solvent medium 2-chloro-3,5-dimethoxyphenyl 2-methoxy-4-hydroxybenzoate with titanium tetrachloride.

References Cited by the Examiner

Cullinane et al.: J. Chem. Soc. (London), 1958, pages 2926–9.

LEON ZITVER, *Primary Examiner.*

LORRAINE A. WEINBERGER, W. B. LONE,
*Assistant Examiners.*